(12) United States Patent  
McLauchlan

(10) Patent No.: US 7,126,073 B2  
(45) Date of Patent: Oct. 24, 2006

(54) INTERMITTENT CONNECTION DEVICE

(75) Inventor: Raymond Bruce McLauchlan, Macomb Township, MI (US)

(73) Assignee: FCI USA, Inc., Reno, NV (US)

( * ) Notice: Subject to any disclaimer, the term of this patent is extended or adjusted under 35 U.S.C. 154(b) by 0 days.

(21) Appl. No.: 11/168,139

(22) Filed: Jun. 27, 2005

(65) Prior Publication Data

US 2006/0016613 A1    Jan. 26, 2006

Related U.S. Application Data

(60) Provisional application No. 60/589,647, filed on Jul. 21, 2004.

(51) Int. Cl.  
H01H 13/52 (2006.01)

(52) U.S. Cl. ...................... 200/530; 439/404

(58) Field of Classification Search ............ 200/61.55, 200/61.56, 61.57, 530, 532; 439/404  
See application file for complete search history.

(56) References Cited

U.S. PATENT DOCUMENTS

| | | | | | |
|---|---|---|---|---|---|
| 674,398 | A | * | 5/1901 | Bower | 200/532 |
| 1,239,054 | A | * | 9/1917 | Sparks | 200/530 |
| 1,336,066 | A | * | 4/1920 | Briggs et al. | 200/532 |
| 1,622,424 | A | * | 3/1927 | Dolan | 200/61.55 |
| 1,683,988 | A | * | 9/1928 | Reading | 200/61.27 |
| 3,808,389 | A | * | 4/1974 | Ramsay et al. | 200/532 |
| 3,928,741 | A | * | 12/1975 | Comer | 200/534 |
| 3,976,350 | A | * | 8/1976 | Keglewitsch | 439/406 |
| 4,052,580 | A | * | 10/1977 | Stanish | 200/535 |
| 4,537,455 | A | * | 8/1985 | Vertenten et al. | 439/404 |
| 4,581,508 | A | | 4/1986 | Shanklin et al. | 200/61.54 |
| 4,758,699 | A | * | 7/1988 | Ciriscioli | 200/530 |
| 5,593,178 | A | | 1/1997 | Shiga et al. | 280/731 |
| 6,780,044 | B1 | * | 8/2004 | Sawyer et al. | 439/417 |
| 2001/0035631 | A1 | | 11/2001 | Hasebe | 280/728.2 |

* cited by examiner

Primary Examiner—Neil Abrams  
(74) Attorney, Agent, or Firm—Harrington & Smith, LLP

(57) ABSTRACT

An intermittent contact connector device including a frame having a first frame section movably connected to a second frame section; two electrical contacts connected to the second frame section, and an electrical shorting member connected to the first frame section. At least one of the contacts is an insulation displacement contact (IDC) member. The shorting member is adapted to contact the two electrical contacts to thereby electrically connect the two electrical contacts to each other when the first frame section is moved towards the second frame section.

23 Claims, 7 Drawing Sheets

INTERMITTENT CONNECTION DEVICE

CROSS REFERENCE TO RELATED APPLICATION

This application claims priority under 35 U.S.C. §119(e) on provisional patent application No. 60/589,647 filed Jul. 21, 2004 which is hereby incorporated by reference in its entirety.

BACKGROUND OF THE INVENTION

1. Field of the Invention

The invention relates to an intermittent connection device and, more particularly, to an intermittent connection device having insulation displacement contacts connected to each other by an electrical shorting member.

2. Brief Description of Prior Developments

U.S. Pat. No. 5,593,178 discloses a steering wheel with an air bag and a horn switch. U.S. Patent Application Publication No. 2001/0035631 A1 discloses an airbag apparatus and horn switches on a steering wheel.

There is a need for an electrical connector which can make a connection for a short user controlled duration, but in a limited space and with a reasonable cost. One such application is in the limited space of a vehicle steering wheel, such as a horn actuator in an automobile. Space in the center hub or spokes of the steering wheel is limited; especially with other components perhaps being located on the steering wheel such as sound system controls, navigation center controls, mobile telephone controls, heating and air conditioning system controls, and the driver's front vehicle air bag. Thus, an intermittent contact connector device is needed which has a small size, but can still be easily actuated by a vehicle operator. In addition, as mentioned above, the cost of the intermittent contact connector device must be reasonable for application in the competitive vehicle/automobile manufacturing market.

SUMMARY OF THE INVENTION

In accordance with one aspect of the invention, an intermittent contact connector device is provided comprising a frame having a first frame section movably connected to a second frame section; two electrical contacts connected to the second frame section, and an electrical shorting member connected to the first frame section. At least one of the contacts is an insulation displacement contact (IDC) member. The shorting member is adapted to contact the two electrical contacts to thereby electrically connect the two electrical contacts to each other when the first frame member is moved towards the second frame member.

In accordance with another aspect of the invention, an intermittent contact connector assembly is provided comprising a frame having a first frame section movably connected to a second frame section, wherein the first frame section comprises a first outward extension and the second frame section comprises a second outward extension; a spring biasing the first frame section in a direction away from the second frame section; an electrical shorting member connected to the frame; and two electrical contacts connected to at least one of the outward extensions. The electrical shorting member is adapted to electrically connect the two electrical contact with each other when the first frame member is moved towards the second frame member to thereby electrically connect the two electrical contacts to each other.

In accordance with one method of the invention, a method of manufacturing an intermittent contact connector assembly is provided comprising movably connecting a first frame section to a second frame section; connecting an electrical shorting member to a first outward extension of the first frame section; connecting two electrical contacts to a second outward extension of the second frame section, wherein at least one of the electrical contacts comprises an insulation displacement contact (IDC) section, and the IDC section is located in a slot of the second outward extension to receive an electrical wire in the slot and the IDC section. When the first frame member is moved towards the second frame member, the electrical shorting member is adapted to contact the two electrical contacts to thereby electrically connect the two electrical contacts to each other.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
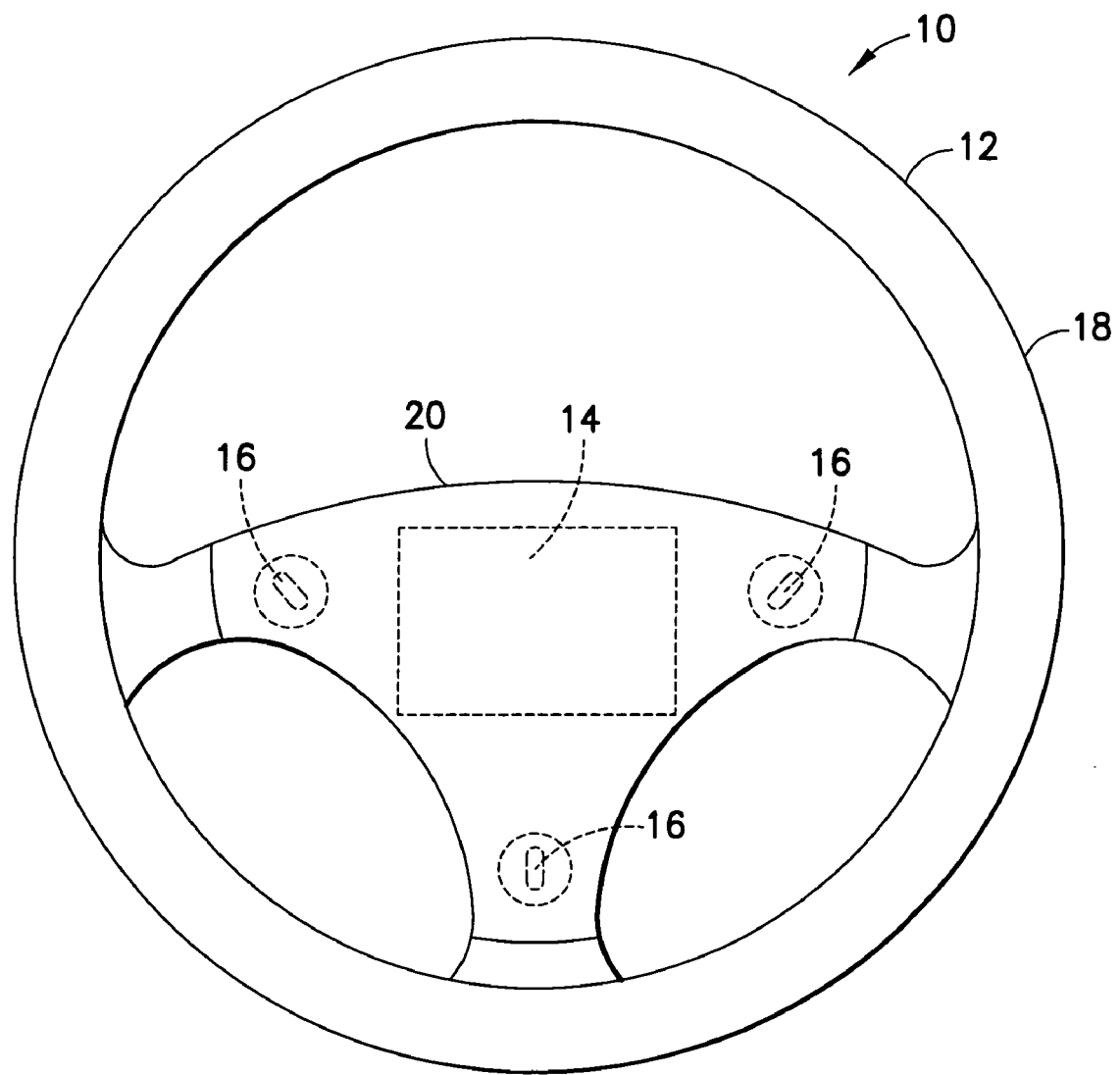
FIG. 1 is a front view of a vehicle steering wheel having intermittent contact connector assemblies incorporating features of the invention.

Referring to FIG. 1, there is shown a front view of a vehicle steering wheel 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
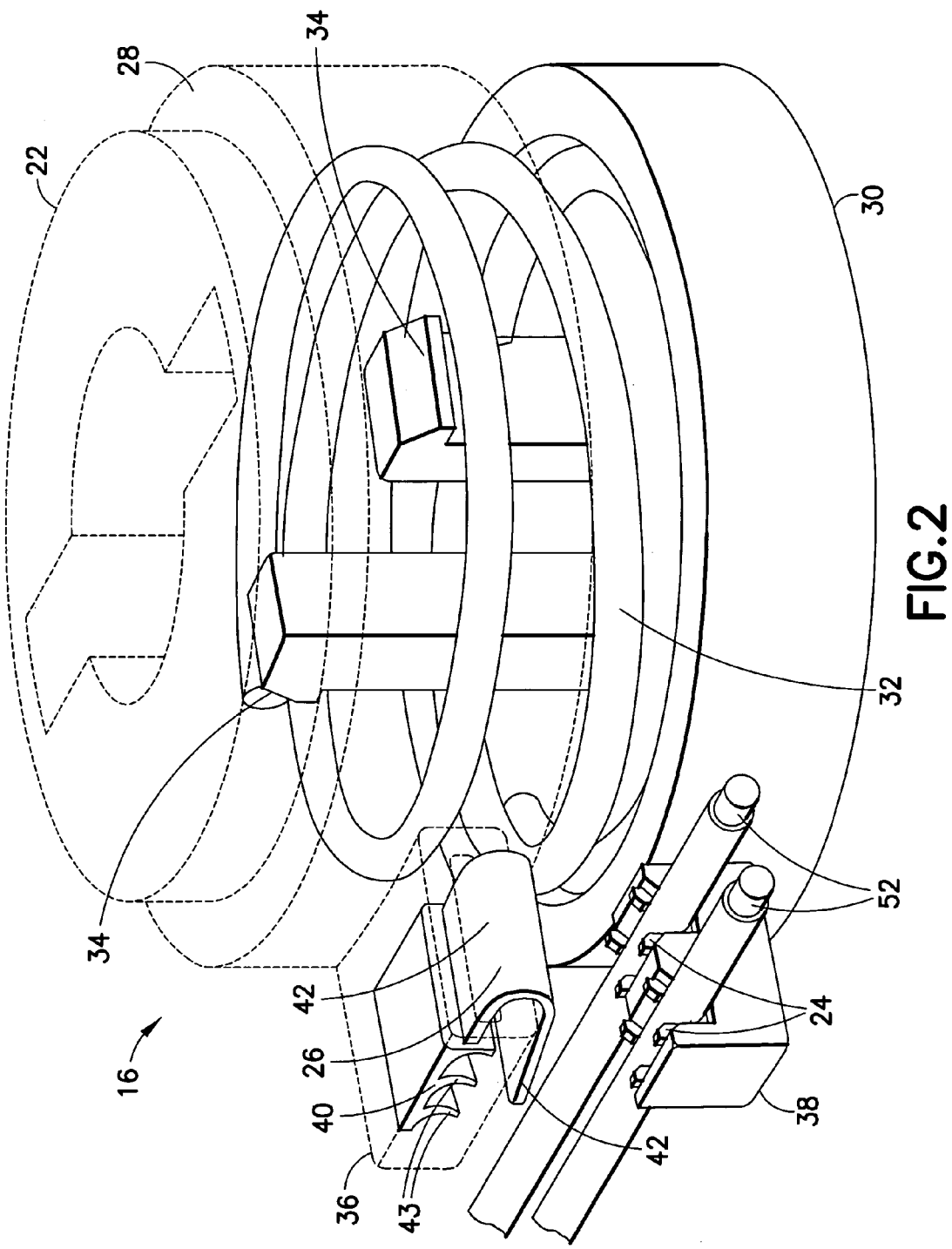
FIG. 2 is a perspective view of one of the intermittent contact connector assemblies shown in FIG. 1.
Figure 3:
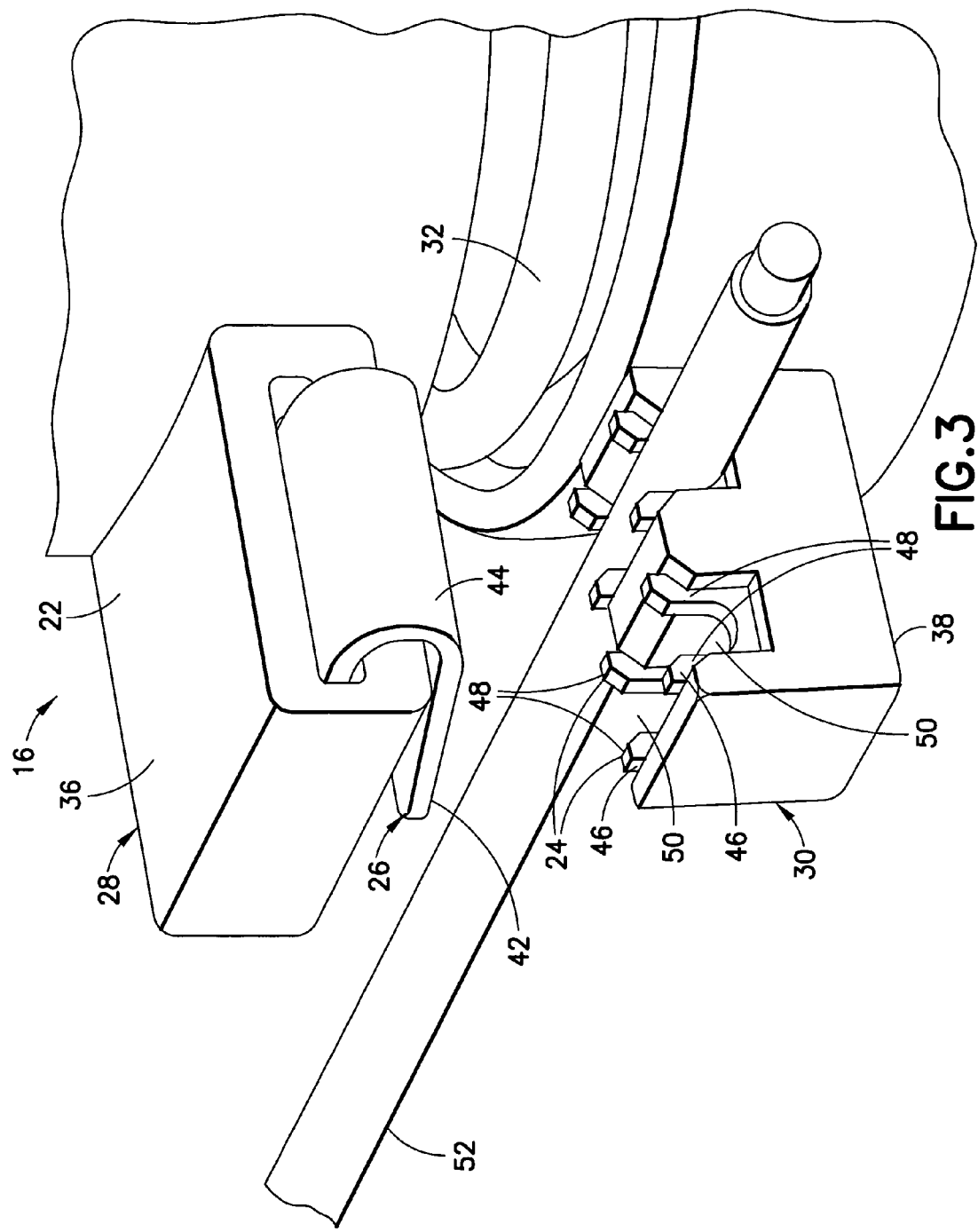
FIG. 3 is an enlarged partial view of the intermittent contact connector assembly shown in FIG. 2.

The steering wheel 10 generally comprises a frame 12, an air bag 14 and horn activators or switches 16. The frame 12 in this embodiment comprises an outer ring section 18 and an inner section 20. The air bag 14 and horn switches 16 are mounted in the inner section 20. Referring also to FIGS. 2 and 3, one of the horn switches 16 is shown. In this embodiment, the horn switch 16 is an intermittent contact connector device or assembly. The assembly 16 is adapted to selectively connect contacts 24 of the assembly to each other. Although the invention is being described with reference to a vehicle steering wheel, the invention could be used in any suitable application or environment.

The intermittent contact connector device 16 generally comprises a frame 22, electrical contacts 24, and an electrical shorting member 26. The frame 22 comprises a first frame member or section 28 and a second frame member or section 30. However, in alternate embodiments the frame could be comprises of more or less than two frame members. For example, the frame could be comprised of a single frame member having two sections attached to each other by a living hinge. The first and second members 28, 30 are preferably comprised of molded plastic or polymer material. However, any suitable material could be used.

A spring 32 is connected to the two frame members 28, 30 to bias the two frame members apart. In this embodiment the spring 32 comprises a coil spring. However, in alternate embodiments any suitable spring could be provided to bias the two frame members apart. For example, the spring could comprise an elastometric O-ring. As another example, the spring could be a member separate from the frame members 28, 30, or could be integral with one or both of the frame members.

The first frame member 28 is movably attached to the second frame member 30 with a movable snap lock connection. The second frame member 30 comprises snap lock retainers or posts 34 which project into the first frame member 28. More or less than two posts could be provided. The second frame section 30 can comprise means for connecting the second frame member to another member of the steering wheel and/or the steering wheel could have a suitable pocket for receiving the assembly 16.

The spring 32 biases the first frame member 28 is a direction away from the second frame member 30. The movable snap lock connection functions as a movement limiter to retain the first frame member 28 with the second frame member 30. The retainers 34 are able to limit outward movement of the first frame member 28 relative to the second frame member 30 and keep the assembly assembled. In alternate embodiments, any suitable assembly retainment system could be provided.

The first and second frame members 28, 30 each comprise a respective outward extension 36, 38. The extensions 36, 38 are preferably integrally formed with the rest of the frame members, but could be separately formed and then attached to the rest of the frame members. The electrical shorting member 26 is connected to the first frame member 28 at the first outward extension 36. The two electrical contacts 24 are connected to the second frame member 30 at the second outward extension 38. In alternate embodiments the electrical shorting member 26 and the electrical contacts 24 could be connected to any suitable portion(s) of the frame members. In addition, in alternate embodiments, more than two extensions 36, 38 could be provided, and/or more than one pair of electrical shorting member 26 and electrical contacts 24 could be provided.

The electrical shorting member 26 comprises a single member made of electrically conductive material, such as metal. The shorting member 26 has a general U shape with a mounting leg 40, a contact leg 42 and a bend 44. The mounting leg 40 preferably comprises mounting barbs 43. The mounting leg 40 is connected to the extension 36 to attach the shorting member 26 to the first frame member 28. In this embodiment the mounting leg 40 is inserted into a slot in the side of the extension 36, such as by a stitched type of machine insertion, such as with a press-fit insertion. However, in an alternate embodiment the first frame member 28 or extension 36 could be overmolded onto the mounting leg 40. As another alternative, the shorting member 26 could be mechanically retained to the first frame member 28 by a separate connector (not shown).

The bend 40 extends around a portion of the side end of the extension 36 and downward. The contact leg 42 extends under the bottom side of the extension 36 from the bend 44. The shorting member 26 is resiliently bendable at the bend 44 to allow the contact leg 42 to deflect upward towards the bottom side of the extension 36. In an alternate embodiment the contact leg 42 could comprise multiple contacts legs; perhaps extending from different sides of the extension 36.

Figure 5:
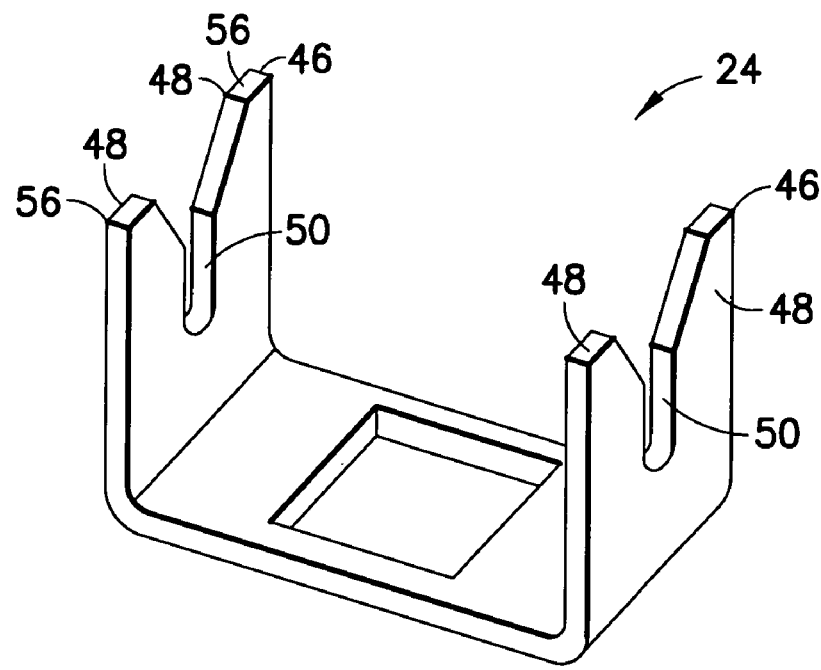
FIG. 5 is perspective view of one of the electrical contacts shown in FIGS. 2 and 3.
Figure 6:
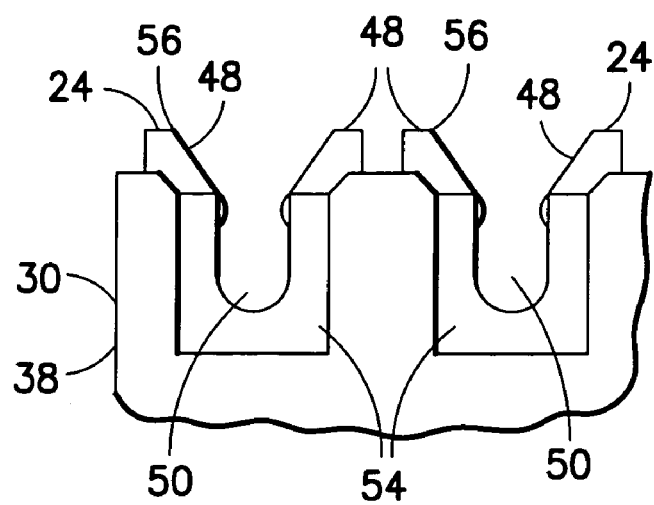
FIG. 6 is a partial end view of the second frame section and electrical contacts shown in FIGS. 2 and 3.

The electrical contacts 24 comprise insulation displacement contact or crimp (IDC) members. However, in alternate embodiments, one or both of the contacts might not comprise an IDC member. Instead, a different system for attaching the wire(s) 52 to the contacts could be provided. Referring also to FIGS. 5 and 6, in this embodiment each contact 24 is comprised of electrically conductive material, such as stamped and formed metal, and has two IDC contact sections 46. Each contact section 46 has two legs 48 with a conductor receiving slot 50 between the two legs. The two contacts are the same, but in alternate embodiments they could be different. Each contact 24 is adapted to receive a portion of one of the two insulated electrical wires 52 therein. The IDC sections 46 are adapted, or sized and shaped, to cut through the electrical insulation on the wires 52 and make a mechanical and electrical connection with the electrical conductors covered by the insulation.

The second outward extension 38 has two parallel slots 54 extending into its top side. The electrical contacts 24 are mounted in the slots 54 parallel with each other. The contacts 24 can be stitch inserted into the second outward extension 38, such as with a press-fit mounting. Alternatively, the extension 38 could be overmolded onto the contacts or the contacts could be attached by a separate connector (not shown).

The electrical wires 52 can be positioned between the two outward extensions 36 and 38 and then pressed into the slots 50; either before or after the first frame section 28 is connected to the second frame section 30. The leg 42 and first frame section 36, because they are located above the top wire entrances to the slots 50, 54, can help prevent or block inadvertent movement of the wires out of the top entrances to the slots 50 and 54, and perhaps aid in insertion into the slots 50, 54. This arrangement could also help to automatically reseat the wires, when the switch 16 is used, if the wires start to inadvertently come out of the top entrances. The top ends 56 of the contacts 24 extend above the top end of the second outward extension 38. These top ends 56 form contact surfaces for the contacts 24 to make electrical contact with the contact leg 42 of the shorting member 26. Use of IDC connection section on the switch assembly 16 allow for easy and fast replacement of the switch assembly 16 by a mechanic if the switch needs to be replaced.

Figure 7:
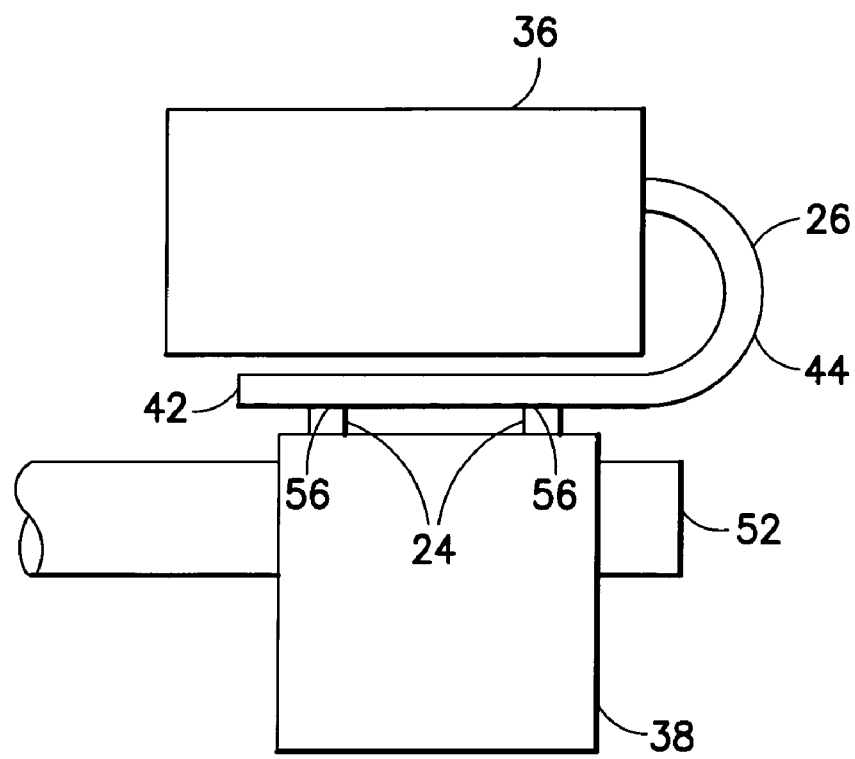
FIG. 7 is a schematic side view of a portion of the assembly shown in FIG. 2 at an actuated ON position.

FIG. 2 shows the assembly 16 at a home OFF position wherein the contact leg 42 does not contact the contacts 24. Thus, the contacts 24 are not electrically connected to each other and the wires 52 are not electrically connected to each other. Referring also to FIG. 7, the assembly 16 is shown at an actuated ON position wherein the contact leg 42 contacts the contacts 24. As seen, the leg 42 can contact the ends 56 and deflect upward. This is a resilient deflection. The leg 42 returns to its shape shown in FIGS. 2 and 3 when the first frame section 28 is released from depression.

The intermittent contact connector device 16 of the invention helps solve the problem of creating an electrical connection of short duration (such as so long as a user actively depresses the first frame section 28 towards the second frame section 30) with limited space and cost. By locating the extensions 36, 38 and contacts 24, 26 at the exterior side of the rest of the frame sections 28, 30, the height of the assembly 16 can be reduced. The invention can provide a connector solution for a horn assembly while still adhering to spatial constraints set previously by existing steering wheel design parameters or newer more limited spatial constraints. The design can include (but are not limited to) an overmolded, or stitched (inserted), or mechanically retained set of metallic crimp-contacts 24, a bifurcated or solid shorting member 26 that can be stitched, or overmolded, or mechanically retained within separate polymer construction respective housings 28, 30, and a compressive spring member 32. The compressive spring member 32 can be a separate or integrated component, and can take the form of a helical spring, an elastomeric O-ring, or any other device supplying mechanical resistance.

The metallic contacts 24 also act as a crimp fashioned in such a way as to strip away the insulation of a discrete wire when pressed into place. This is commonly known as an Insulation Displacement Crimp (IDC) and is generally used to make electrical contact without having to go through the labors of stripping the insulation in order to access the electrical conductor for contact. This makes for a very cost effective termination and connection solution.

The logistics for the intermittent contact assembly shown are quite simplistic for this specific application and, thus, cost efficient. The base concept may proliferate itself to span other variations while still maintaining the original intent. The function of the assembly is to receive a force (directly or indirectly) on either side of the assembly 16 until the shorting member 26 comes in contact with the top ends of the legs 48 of the IDC contacts 24. Due to the sloping angle of the shorting member 26, the top ends of the IDC contacts 24 can scrape or wipe against the bottom side of the contact leg 42 of the shorting member 26 as the shorting member 26 is being deflected. This scraping or wiping can create a clean electrical contact between the shorting member 26 and the electrical contacts 24. Once the force is removed from the assembly 16, the contact between the shorting member 26 and the IDC contacts 24 is disengaged.

As seen in FIG. 1, in this specific iteration of the design there are three intermittent-contact assemblies located on the corners behind the hub of an automotive steering wheel. In an alternate embodiment there could be more or less than three assemblies 16. For example, in one type of specific iteration of the design, there are four intermittent-contact assemblies located on the rectangular corners behind the hub of an automotive steering wheel. When the hub is depressed, the contact made by the IDC contacts 24 and the shorting member 26 causes the horn to sound. It should also be noted that additional sets of IDC contacts and shorting members (space allowing) could be added to insure that one of the mating pairs makes contact each and every time. This could prove to be important in cases of side loaded forces applied to the steering wheel hub.

Figure 4:
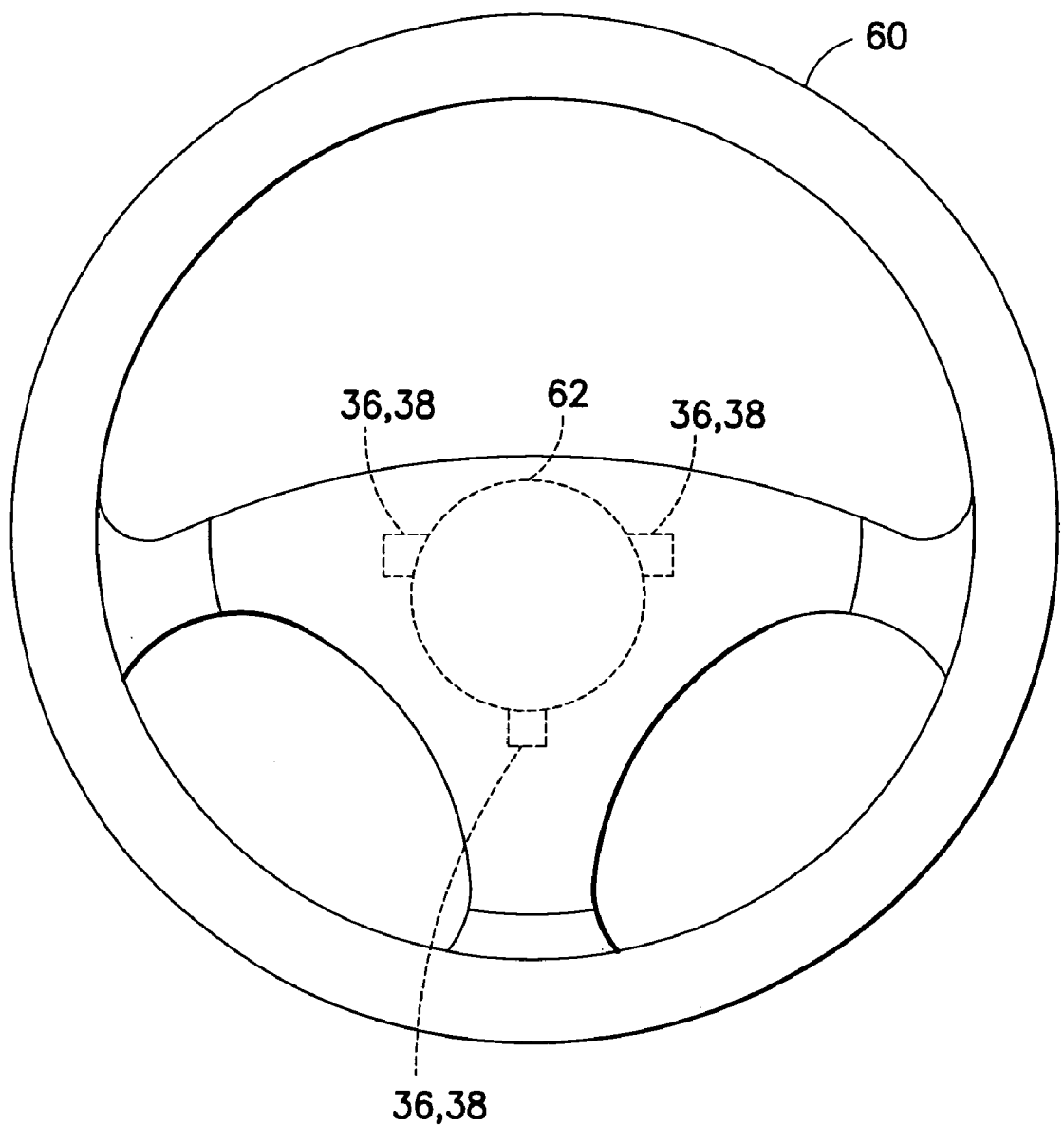
FIG. 4 is a front view of an alternate embodiment of a vehicle steering wheel having an intermittent contact connector assembly incorporating features of the invention.

Referring to FIG. 4, an alternate embodiment of a vehicle steering wheel 60 having an intermittent contact connector assembly 62 incorporating features of the invention is shown. In this embodiment the steering wheel comprises only one intermittent contact connector assembly 62. The intermittent contact connector assembly 62 is substantially identical to the switch 16. However, the assembly 62 is larger, is centrally located at the hub of the steering wheel, and has multiple outward extensions 36, 38 with multiple pairs of contact members and shorting members. The assembly can be located behind the air bag.

Figure 8:
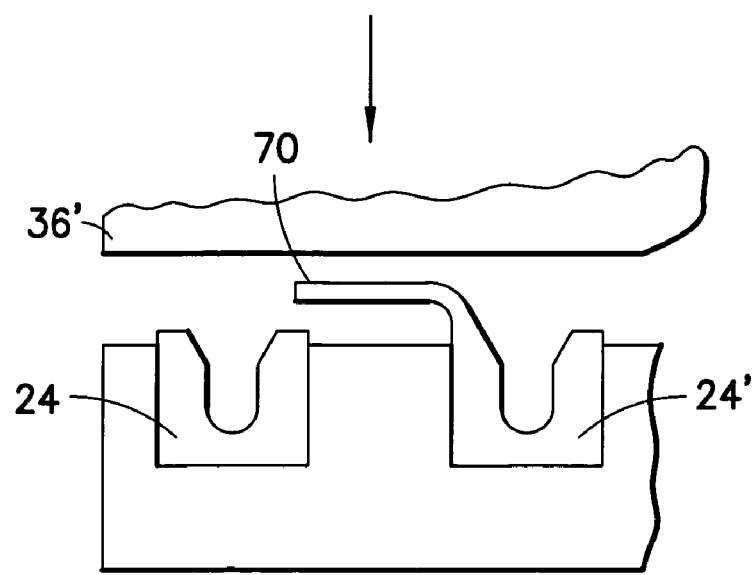
FIG. 8 is a partial end view of another embodiment of the invention.
Figure 9:
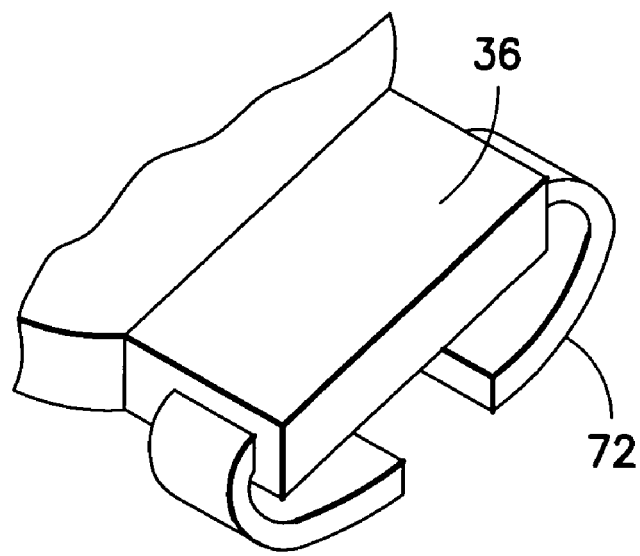
FIG. 9 is a partial perspective view of another embodiment of the invention.
Figure 10:
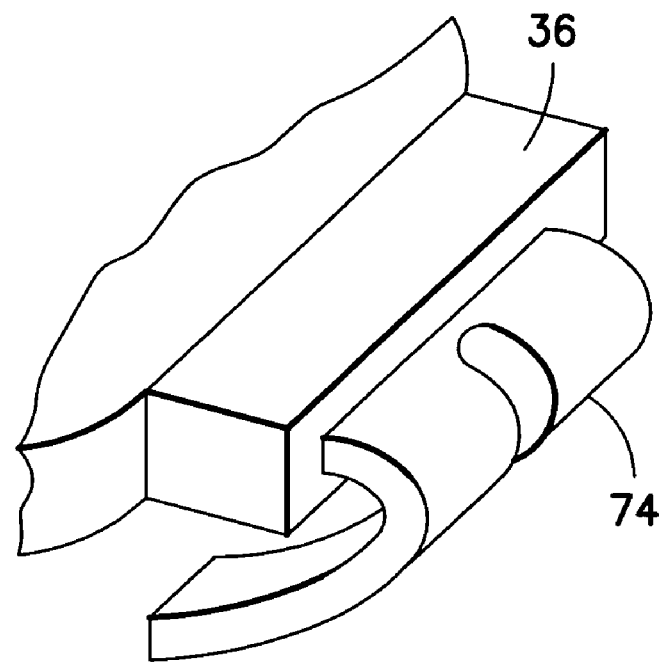
FIG. 10 is a partial perspective view of another embodiment of the invention.

FIGS. 8–10 show some examples of other alternate embodiments. In FIG. 8 the shorting member 70 is integral with a first one of the contacts 24'. The first extension section 36' does not comprise a separate shorting member. The shorting member 70 functions as a deflectable leg. The shorting member 70 is adapted to be resiliently deflected by the first extension section 36' into contact with the second contact 24. Thus, a member which is separate from the contacts and which functions as the shorting member need not be provided; it can be provided integral with one or both of the contacts. In FIG. 9 the shorting contact 72 comprises two legs 74 extending from opposite sides of the first outward extension 36. In FIG. 10, the shorting contact 74 is a single member with two parallel legs (bifurcated legs) extending from an outward facing side of the first outward extension 36. These are only examples. Other configurations could be devised by those skilled in the art. For example, one of the contacts 24 could be located on the first extension 36 and the other contact 24 could be located on the second extension, and the two contacts could have shorting sections adapted to contact each other when the switch is actuated/depressed.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An intermittent contact connector device comprising:
   a frame having a first frame section movably connected to a second frame section;
   two electrical contacts connected to the second frame section, wherein at least one of the contacts comprises an insulation displacement contact (IDC) member; and
   an electrical shorting member connected to the first frame section, wherein when the first frame member is moved towards the second frame member the shorting member is adapted to contact the two electrical contacts to thereby electrically connect the two electrical contacts to each other, wherein the IDC member comprises legs with ends located to be directly contacted by the shorting member when the shorting member is moved into contact with the electrical contacts.

2. An intermittent contact connector device as in claim 1 further comprising a spring biasing the first frame section in a direction away from the second frame section.

3. An intermittent contact connector device as in claim 2 wherein the first frame section is snap lock mounted to the second frame section by a snap lock connection to provide a movement limiter system to limit movement of the first frame section relative to the second frame section in the direction away from the second frame section.

4. An intermittent contact connector device as in claim 3 wherein the snap lock connection comprises two snap lock posts and the spring comprises a coil spring around the posts.

5. An intermittent contact connector device as in claim 1 wherein the first frame section comprises a first outward extension and the second frame section comprises a second outward extension, and wherein the electrical shorting member is mounted on the first outward extension and the two electrical contacts are mounted on the second outward extension.

6. An intermittent contact connector device as in claim 5 wherein the second frame section comprises at least one slot adapted to receive at least one electrical wire in the slot and at least a portion of the IDC member.

7. An intermittent contact connector device as in claim 6 wherein the IDC member comprises two IDC sections for connecting to an electrical wire in two locations.

8. An intermittent contact connector device as in claim 7 wherein each of the two electrical contacts comprises a respective IDC member which are parallel to each other.

9. An intermittent contact connector device as in claim 1 wherein the electrical shoring member comprises a deflectable leg for contacting at least one of the two electrical contacts.

10. An intermittent contact connector device as in claim 1 wherein the electrical shorting member is integral with a first one of the electrical contacts.

11. An intermittent contact connector device as in claim 1 wherein the first and second frame sections form a hollow structure surrounding a spring biasing the frame sections apart, and wherein the hollow structure forms a central axis with the extensions extends outward away from the central axis in a general cantilever fashion.

12. An intermittent contact connector assembly comprising:
a frame having a first frame section movably connected to a second frame section, wherein the first frame section comprises a first outward extension and the second frame section comprises a second outward extension;
a spring biasing the first frame section in a direction away from the second frame section;
an electrical shorting member connected to the first outward extension; and
two electrical contacts mounted to the second outward extension, wherein the two electrical contacts comprise insulation displacement contact (IDC) sections, and wherein the electrical shorting member is adapted to electrically connect the two electrical contacts with each other when the first frame section is moved towards the second frame section to thereby electrically connect the two electrical contacts to each other.

13. An intermittent contact connector assembly as in claim 12 wherein the first frame section is snap lock mounted to the second frame section by a snap lock connection to provide a movement limiter system to limit movement of the first frame section relative to the second frame section in the direction away from the second frame section.

14. An intermittent contact connector assembly as in claim 13 wherein the snap lock connection comprises a snap lock post and the spring comprises a coil spring around the post.

15. An intermittent contact connector assembly as in claim 12 wherein the second frame section comprises slots adapted to receive electrical wires in the slots and at least a portion of the IDC sections.

16. An intermittent contact connector assembly as in claim 12 wherein the electrical shoring member comprises a deflectable leg for contacting at least one of the two electrical contacts.

17. An intermittent contact connector assembly as in claim 12 wherein the electrical shorting member is integral with a first one of the electrical contacts.

18. A method of manufacturing an intermittent contact connector assembly comprising:
movably connecting a first frame section to a second frame section;
connecting an electrical shorting member to a first outward extension of the first frame section;
connecting two electrical contacts to a second outward extension of the second frame section, wherein at least one of the electrical contacts comprises an insulation displacement contact (IDC) section, and the IDC section is located in a slot of the second outward extension to receive an electrical wire in the slot and the IDC section, and
wherein, when the first frame member is moved towards the second frame member, the electrical shorting member is adapted to contact the two electrical contacts to thereby electrically connect the two electrical contacts to each other.

19. A method as in claim 18 wherein movably connecting the first frame section to the second frame section comprises snap lock mounting the first frame section to the second frame section with a spring therebetween.

20. A method as in claim 18 wherein connecting the two electrical contacts to the second outward extension of the second frame section comprises locating wire entrances of the IDC section opposite the first outward extension.

21. An intermittent contact connector device comprising:
a frame having a first frame member movably connected to a second frame member by at least one post, wherein the first frame member comprises a first cantilevered extension, and wherein the second frame member comprises a second cantilevered extension;
a spring located around the at least one post and biasing the first and second frame members apart;
an electrical shorting member mounted on the first cantilevered extension; and
two insulation displacement contact (IDC) electrical contacts mounted in the second cantilevered extension, wherein each IDC contact comprises a wire entrance slot into the IDC contact directly opposite the electrical shorting member, wherein when the first frame member is moved towards the second frame member the shorting member is adapted to contact the two electrical contacts to thereby electrically connect the two electrical contacts to each other.

22. An intermittent contact connector device comprising:
a frame having a first frame member movably connected to a second frame member, wherein the first frame member comprises a first cantilevered extension, and wherein the second frame member comprises a second cantilevered extension;
a spring connected to the first and second frame members and biasing the first and second frame members apart;
an electrical shorting member comprises a general U-shaped member having a first end fixedly mounted in the first cantilevered extension and an opposite deflectable second end located between the first cantilevered extension and the second cantilevered extension; and
two insulation displacement contact (IDC) electrical contacts mounted in the second cantilevered extension, wherein when the first frame member is moved towards the second frame member the second end of the shorting member is adapted to contact the two electrical contacts to thereby electrically connect the two electrical contacts to each other.

23. An intermittent contact connector device comprising:
a frame having a first frame member movably connected to a second frame member, wherein the first frame member comprises a first cantilevered extension, and wherein the second frame member comprises a second cantilevered extension, wherein the second cantilevered extension comprises two contact pockets, wherein each contact pocket comprises a wire slot in opposite walls of the second cantilevered extension;

a spring connected to the first and second frame members and biasing the first and second frame members apart;

an electrical shorting member mounted on the first cantilevered extension; and two insulation displacement contact (IDC) electrical contacts mounted in respective ones of the contact pockets of the second cantilevered extension, wherein each IDC contact comprises a wire slot aligned with the wire slots of their respective contact pockets, wherein each IDC contact comprises legs which extend out of the contact pockets of the second cantilevered extension, and wherein when the first frame member is moved towards the second frame member the shorting member is adapted to contact the ends of the two electrical contacts to thereby electrically connect the two electrical contacts to each other.

* * * * *